United States Patent
Shimomura et al.

(10) Patent No.: US 7,200,593 B2
(45) Date of Patent: Apr. 3, 2007

(54) DOCUMENT MANAGEMENT SYSTEM

(75) Inventors: Osamu Shimomura, Tokyo (JP); Hidenori Sakai, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 254 days.

(21) Appl. No.: 10/042,316

(22) Filed: Jan. 11, 2002

(65) Prior Publication Data
US 2002/0095432 A1    Jul. 18, 2002

(51) Int. Cl.
*G06F 17/30* (2006.01)

(52) U.S. Cl. ............................. 707/9; 711/163; 711/164

(58) Field of Classification Search ................ 707/9, 707/3; 711/147, 163, 164; 726/21
See application file for complete search history.

(56) References Cited
U.S. PATENT DOCUMENTS

| | | | |
|---|---|---|---|
| 5,455,941 A | * | 10/1995 | Okuno et al. .................. 707/9 |
| 5,754,686 A | * | 5/1998 | Harada et al. ............... 382/187 |
| 6,105,027 A | * | 8/2000 | Schneider et al. .............. 707/9 |
| 6,236,996 B1 | * | 5/2001 | Bapat et al. .................... 707/9 |
| 6,647,388 B2 | * | 11/2003 | Numao et al. .................. 707/9 |
| 6,678,682 B1 | * | 1/2004 | Jenkins et al. .................. 707/9 |

* cited by examiner

*Primary Examiner*—Jeffrey Gaffin
*Assistant Examiner*—CamLinh Nguyen
(74) *Attorney, Agent, or Firm*—Rabin & Berdo, P.C.

(57) ABSTRACT

A document management system can access a necessary document fast when necessary and accurately limit access in accordance with various security levels. An access control list shown in FIG. 2 mainly functions when access to a document is limited. One row in the access control list includes a plurality of fields which are described at the head row of each column. Information in each field included in one row (record) indicates the overall information necessary for setting predefined access control to the document including one character string. A "character string" field means that the document including the character string described in the field, of many documents stored in a database, is a document to which the access is limited.

18 Claims, 5 Drawing Sheets

FIG. 2

| ID | CHARACTER STRING | ACCESS PERMITTED USER | ACCESS LEVEL | VALID TERM | LEVEL AFTER VALID TERM |
|---|---|---|---|---|---|
| | 「ABC」 | TARO KOUMURA | 3 | 2000/09/30 | 1 |
| | 「CDE」 | JIRO OTSUNO | 3 | 2000/09/30 | 1 |
| | 「GHIJ」 | SABURO HEII | 2 | 2000/09/30 | 1 |
| | 「KLM」 | SHIRO CHOUNO | 1 | 2000/09/30 | 0 |
| ⋮ | ⋮ | ⋮ | ⋮ | ⋮ | ⋮ |

FIG. 3

| ACCESS LEVEL | CONTENTS |
|---|---|
| 3 | NOT VIEWING |
| 2 | ONLY VIEWING OK |
| 1 | PRINTING OK |
| 0 | MODIFICATION OK |

DOCUMENT MANAGEMENT SYSTEM

BACKGROUND OF THE INVENTION

1. Field of the Invention

The present invention relates to a document management system for managing a large number of documents while ensuring the security at various levels.

2. Description of the Related Art

In document management systems which have been put into practical use, computers manage, in a lump, a numerous number of documents such as various source materials, text, drawings, etc. which are formed by companies, academes, and government and other public offices and if necessary, applicable documents can be searched fast and be re-used (accessed).

However, the above-mentioned documents include various-security-levels documents, e.g., generally published documents or documents for specific members in companies, and documents which permit viewing thereof but inhibit printing thereof or which permit modification of contents thereof or inhibit all modification. There is no original advantage of the document management systems in that necessary documents of a numerous number of ones can be accessed fast if necessary, when the document is required to be accessed, then, the security level of the document is defined, and the access is limited based on this defined result.

SUMMARY OF THE INVENTION

Accordingly, the present invention is devised based on the above-mentioned circumstances and it is an object of the present invention to provide a document management system for accessing a necessary document fast when necessary and for accurately limiting access in accordance with various security levels.

To accomplish the above object, according to an aspect of the present invention, there is provided a document management system for limiting user access to a registered document, wherein access controlling information including at least specific data is added to a document to be registered and said document to be registered is registered, when said document to be registered includes said specific data, and access to said document is limited in accordance with contents of the added access controlling information, when the access to said document is thereafter requested.

Preferably, in the document management system, said access controlling information includes not only said specific data but also information indicating how the access to said document is limited and, when the access to said document is requested, it is defined by referring to said information, how the access is limited.

Further, preferably, in the document management system, it is defined whether or not the document to be registered includes said specific data at any one of time when said document is registered, time when said access controlling information is registered, and time when the access to said document is requested.

Furthermore, preferably, in the document management system, said access controlling information includes information to specify a person to be permitted to access with limitation.

In addition, preferably, in the document management system, said access controlling information includes a valid term in which the access is limited.

In addition, preferably, in the document management system, said access controlling information is provided in a single record comprising a plurality of fields, includes ID information for specifying said record, and said record is added to the document by relating said ID information to the document.

BRIEF DESCRIPTION OF THE DRAWINGS

FIG. 2 is a diagram showing a format example in which an access control list mainly functions when the access to the document is limited;

FIG. 3 is a table showing an example of contents of the access levels described in an access level field and symbols indicating the contents of the access levels;

DESCRIPTION OF THE PREFERRED EMBODIMENTS

Figure 1:
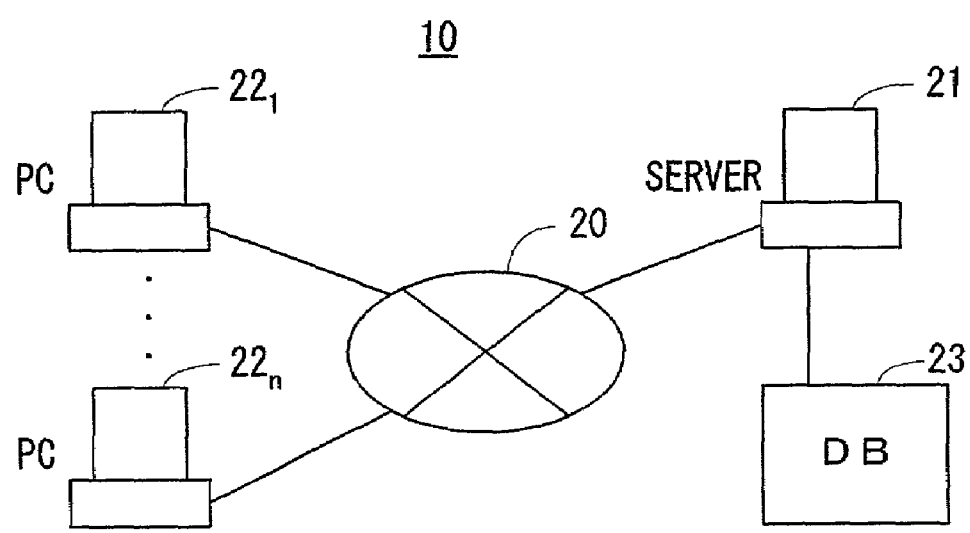
FIG. 1 is a diagram showing an example of the hardware architecture for embodying a document management system in the present invention.

Hereinbelow, a description is given of an embodiment of the present invention with reference to the drawings. FIG. 1 is a diagram showing an example of the hardware architecture for embodying a document management system in the present invention. Referring to FIG. 1, in a document management system 10, a server 21 and client terminals $22_1$ to $22_n$ are connected to a network 20 and a database (DB) 23 is connected to the server 21. The applicable network 20 includes the Internet, LAN, WAN, etc. For example, a workstation or a mainframe can be used for the server 21 and a workstation or a personal computer (PC) can be used for the client terminals $22_1$ to $22_n$.

In the document management system 10 according to the embodiment, when a user requests the access to one of documents which are stored in the database 23 under the management of the server 21, through one of the client terminals $22_1$ to $22_n$, and when an access control to the document is set, user access to a part of or all of the documents is limited in accordance with the contents of the access control so as to sufficiently ensure the security of important documents.

Herein, "access" includes user viewing, printing, and copying to a different medium, of the specific document stored in the database 23, and modification of the document contents. "Access control" means that the viewing, printing, copying and/or modification of a part or all of the specific document is inhibited. Further, "setting of the access control" means that user access is limited by adding predefined ID information to the document registered in the database 23, which will be described later.

In the document management system 10 according to the embodiment, an "access control list" as an example of a format, as shown in FIG. 2, mainly functions when the access to the document is limited. The access control list is stored in the server 21. Although the access control list is necessary for operating the document management system 10, the contents of the access control list changes in accordance with the operations thereof.

In the access control list shown in FIG. 2, one row comprises a plurality of items described at the head row of each column (hereinafter, referred to as a "field"). Each row consists of fields (hereinafter, referred to as a "record") and includes all information for setting a predefined access control to the document having a character string.

Referring to FIG. 2, a "character string" field means that the document including the character string described in the field, of many documents stored in the database 23, is a document to which the access is limited. Therefore, when a document is registered to the database 23 in the document management system 10, the server 21 searches whether or not the document includes the described character string in the "character string" field in FIG. 2 as will be described later. Although the "character string" is used to facilitate easy understanding of the description, it may be a data string such as a bit string.

An "access permitted user" field contains described information for specifying a user who can be permitted to access, with limitation, the document including the "character string". As shown in FIG. 2, the described information may use one or more user names, may use an organization name such as an "account department", an "personnel department", and a "product development department", or may use an official title in a company organization such as "manager or higher", "general manager or higher" or "director or higher". Alternatively, the described information may use a part of or all of the above mentioned information. When the described information uses a general name such as the organization name or official title, individual users corresponding to the general names become the access permitted user. When the access permitted user is not specified and all users are subjected to access control, the "access permitted user" field is not essentially filled.

An "access level" field is used to define how the access to the document including the character string entered in the "character string" field is limited. In other words, it is used to define the security level to the each document.

FIG. 3 is a table showing an example of contents of the access levels described in the "access level" field and symbols indicating the contents of the access levels. A case of setting the access level in accordance with the contents in FIG. 3 will be described hereinbelow. When, for example, a level 3 as the access level is assigned to a character string, the viewing of the overall document including the character string is inhibited and the modification and printing thereof are inhibited. Also, when a level 2 is added, the viewing of the document including the character string is permitted on a display screen and, however, the modification and printing thereof are inhibited. Further, when a level 1 is added, both the viewing and the printing are permitted and, however, the modification is inhibited. Furthermore, when a level 0 is added, the viewing, the printing, and the modification are permitted and, however, deletion of the document is inhibited.

In addition to the above operations shown in FIG. 3, various operations to define the access level can be considered. Although the access level is defined mainly in view of the operation to access the document in FIG. 3, it can be defined in view of a fact that which part of the document is subjected to the access control. That is, only a cover sheet can be referred to with respect to the document including the character string described in the "character string" field, the viewing of only a page containing the character string included in the "character string" field is inhibited, or only a part of the corresponding character string is blackened and displayed. Alternatively, the access level can be defined in view of the "access permitted user" such as an access level permitting the viewing of only a president in a company, of only a general manager or higher, of only a manager, of all members in the company, of users outside of the company.

A plurality of access levels can be set within one record by limiting the access to the document including the character string of a name of a certain compound, and by further highly limiting the access to the document describing a specific component ratio of the compound so as to narrowly limit the range of the access permitted users. On the contrary, two simple access levels of "accessible" and "inaccessible" can be applied to the document including a character string. As mentioned above, the manner to define the access level is not limited and the manner suitable to individual situations may be selected.

Among the access control list shown in FIG. 2, a "valid term" field is used to define the end day in a term in which the access level defined in the "access level" field is valid. In the example shown in FIG. 2, "Sep. 30, 2000" is described in the "valid term" field of a record corresponding to a character string "ABC" and this description indicates a determination in that the access level "3" is valid for the character string "ABC" until Sep. 30, 2000.

The above-described operation for defining the valid term of the access level is necessary in the following cases. That is, when the character string "ABC" is a name of a product development project or a product development code in a company, which is released on Oct. 1, 2000, a range of the access permitted users to the document including the character string "ABC" is narrowly limited even in the company until Sep. 30, 2000. In the example shown in FIG. 2, after the valid term, it is defined in a "level after the valid term" field that the access level is decreased to be "1" and the access control is relaxed. If the access level is not defined in the "level after the valid term" field, the access control to the document including the character string is canceled.

The "valid term" field is not limited to one "valid term" field and a plurality of valid terms may be set. In this case, the access level for limiting the access to the document is changed step by step after the individual valid terms.

Generally, when it is over the valid term as shown in the example of FIG. 2, the access level to the document including the character string is set to be low. However, it is desired that the access level in any desired valid term is to be higher after the valid term, depending on the situation.

It is assumed that an up-version product of computer software is sold on Oct. 1, 2000 and, thereafter, an old-version product is not sold. Up-version and old-version operation-manual documents are stored in the database 23, and the old-version operation manual document is used until Sep. 30, 2000 but it is switched to the up-version operation manual document after Oct. 1, 2000. In this case, the access level of the "level after the valid term" field to the old-version operation manual document may be increased, and the old-version operation manual document may be not referred to only an exceptional case after Oct. 1, 2000. Then, erroneous use of the up-version operation manual and the old-version operation manual is prevented and it is prevented that the old-version operation manual is erroneously distributed to a client out of the company after selling the up-version product.

As another example, it is assumed that general manufacturing methods of a chemical product or a medical product are described in a document, and a project for developing a new product based on the document is planned. And, in a developing process of the product, experiments are repeated while gradually determining a detailed component-ratio and the experiment results are sequentially added and described to the document. According to a first plan, when the experiment is started by using a specific component-ratio after one date, the access level is increased after the date and the access control of a user as a company member must be enforced. This case is one example in which the access level of the "level after the valid term" field must be increased.

By introducing a concept of the "valid term" of the access level, the contents of the access control can be dynamically changed in the case of the same document or the same character string.

Referring to FIG. 2, an "ID" field provided at the left end of each row is used to describe ID information for specifying each record. Therefore, each record can be uniquely specified based on the ID information described in the "ID" field. For example, when it is understood that one document includes the character string "ABC" at the first line in the access control list shown in FIG. 2, the ID information described in the ID field at a first-line record is added to the document upon registering. Consequently, the access control can be set to the document by adding the ID information.

In some cases, a plurality of access controls can be set to one document. When one document includes not only the character string "ABC" but also a character string "CDF", the ID information for specifying the first-line record and the ID information for specifying a second-line record shown in FIG. 2 are added to the document and thus two access controls are set.

As described above, since the character string registered in the "character string" field in FIG. 2 is a key word and the access to the document is limited based on the key word, the character string included in the "character string" field must be accurately registered in the access control list to accurately limit the access to a certain range of the document. Then, the access to an important document is limited by the following method as one example.

It is assumed that one project is set up in a company and it is defined that the access to all the documents concerning the project is limited at a predefined access level. In this case, it is agreed in advance that predefined character strings such as a project name, an encipher, etc. are necessarily described at an arbitrary position of all the documents concerning the project or at a predefined position thereof. Also, the record in which the character string is described in the "character string" field is formed and the formed record is registered in the access control list shown in FIG. 2. After preparing the above conditions, all the documents concerning the project are registered in the database 23 in FIG. 1. If so, parties concerning the project can always access these documents any time at which they are needed. When members other than the parties concerning the project try to access the document, the access can be limited in accordance with the contents of the access level registered in the access control list and both the convenience and the security can be established.

Figure 4:
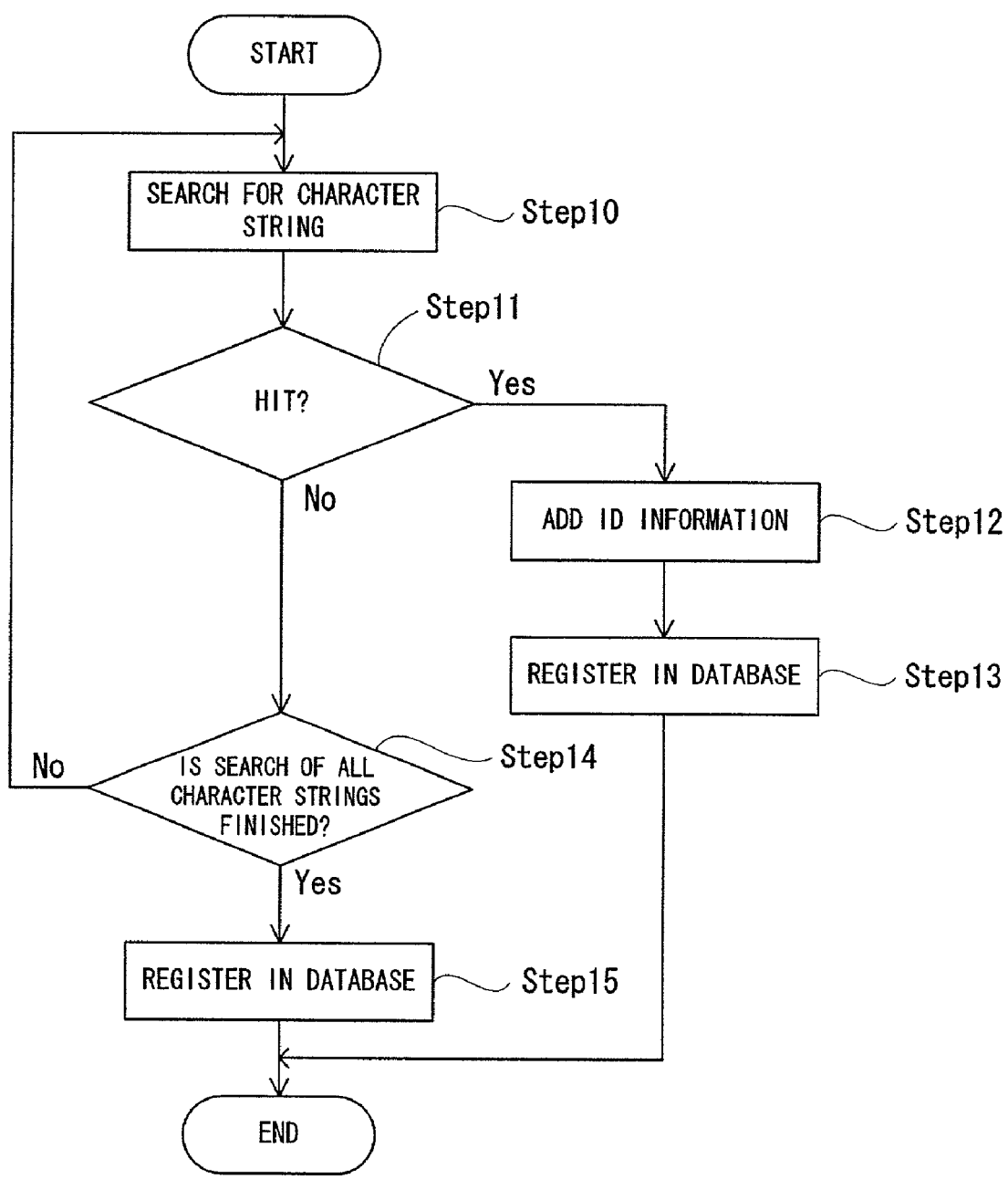
FIG. 4 is a flowchart showing a sequence for registering, to the document management system, a document whose access is limited.

Next, a description is given of a sequence for registering a document to which access is limited in the document management system according to the embodiment of the present invention with reference to the flowchart shown in FIG. 4. In this case, it is assumed that the access control list shown in FIG. 2 has been already prepared in the server 21.

When one document is registered, first, the document management system sequentially searches for, in the document, each character string registered in the "character string" field in the access control list in FIG. 2 which is provided in advance, on the server 21 (step 10). As a search result, if the character string registered in the "character string" field in FIG. 2 is included in (hit to) the document (step 11), the ID information of the record including the character string is added to the document (step 12) and the document with the ID information is registered in the database 23 (step 13). Thus, the access control is set to the document. When one document includes a plurality of character strings registered in FIG. 2, a plurality of pieces of ID information are added to one document and a plurality of access controls are set.

All the character strings are subjected to the similar process (step 14). If the character string registered in the access control list is not included in the registered document, the ID information is not added to the document. That is, the access control is not set and the document is registered to the database 23 (step 15).

Figure 5:
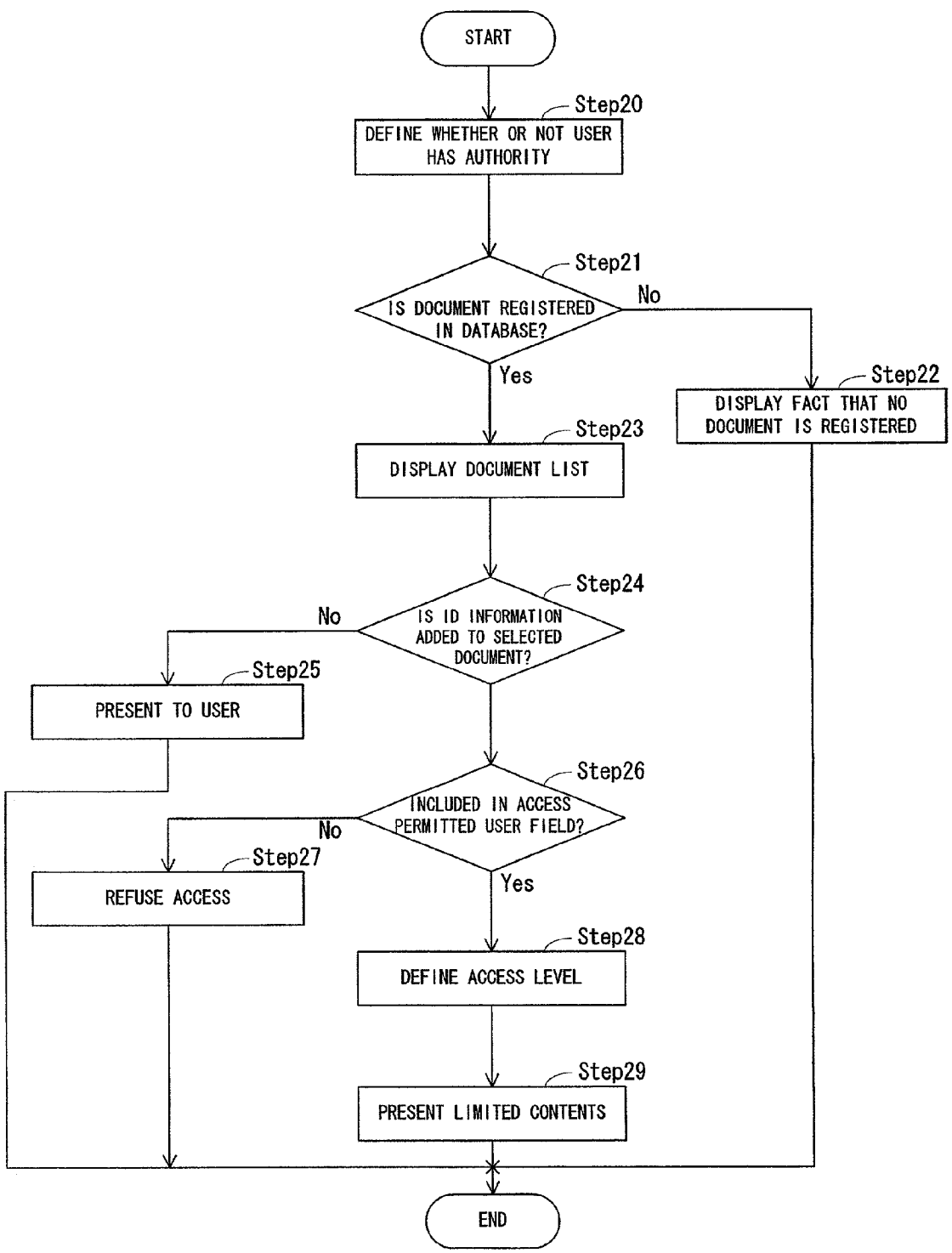
FIG. 5 is a flowchart showing a processing sequence when access to a document registered to a database is requested.

Next, a description is given of a processing sequence when the access to the document registered in the database 23 in the document management system 10 is requested, with reference to the flowchart shown in FIG. 5. When a user uses the document management system 10, first, it is defined whether or not the user himself has an authority for using the document management system 10 (step 20). According to a general method for determining whether or not the user has the authority for using the document management system 10, the input of an ID code and a password for authenticating the user is requested, and the server 21 authenticates whether or not the user is an identical person, based on the requested input by referring to a company member database which is separately provided.

If it is defined that the user is a person having the authority for using the document management system, it is defined whether or not the document is registered in the database 23 (step 21). In the determination in step 21, the document which the user tries to access may be searched based on attribute information such as a document name, a document creator name and a document number. Alternatively, the user may input a keyword and it may be searched whether or not the character string is included in all documents. Or, the following method may be used. That is, when files are stored in the database 23 in a hierarchy structure, a folder tree is displayed as a GUI and the user searches for the file by using the folder tree in descending direction. When he finds his desired file, a name of the found file is clicked and the document is selected.

Accordingly, if the corresponding document is not registered in the database 23, such a fact is displayed to the user (step 22). On the other hand, if the corresponding document or the document for which the user searches is registered in the database 23, the document list is displayed on the screen of the server 21 (step 23). Thus, the user is prompted to select the document to be accessed. Sequentially, it is checked whether or not the ID information for determining the record of the access control list shown in FIG. 2 is added to the selected document (step 24). If NO in step 24, the access control is not set to the document. In this case, data of the document is presented to the user so that the user uses the document in his desired format such as viewing, printing, and modification (step 25).

On the contrary, if YES in step 24, first, it is defined whether or not the authenticated user is included in the members described in the "access permitted user" field (step 26). If NO in step 26, the access is refused at this timing (step 27). If YES in step 26, the present date is compared with the valid term, the access level to be applied at the present time is defined (step 28). The corresponding document is subjected to a process for user with the contents limited based on the defined access level (step 29).

If a plurality of pieces of ID information are added to the corresponding document and each of the "access permitted user" fields includes the corresponding user, the access is limited based on, for example, the higher access level in accordance with a predefined algorithm.

Next, a description is given of a process when a new record is added to the access control list. If business activity comes alive, it is considered that the number of secret documents is increased. In this case, the number of chances to add a new record to the access control list can be increased. As mentioned above, when a new record is added to the access control list, it is searched whether or not there is a document including the character string in the record, of all the documents which have been already registered in the database 23, every adding a new record. If the document including the character string is found, the access control is set to the document based on the record concerning the character string. Thus, if the corresponding document is the document which has been already registered, the document becomes a target of the access control by using the newly added record.

If the access control to the predefined document is released, the following operation is executed. That is, it is assumed that the record in which a project name is described in the "character string" field is registered, then, the project is finished, and the access control to the document concerning the project is released. In this case, when the record is registered in advance, the date to finish the project is defined in advance in the "valid term" field. According to a first method, the "level after the valid term" is a value at which no access control exists or according to a second method, the record is deleted from the access control list when the access control is unnecessary. In this case, preferably, the second method may be adopted when the record is unnecessary because the search for the character string described in the "character string" field of the record is unnecessary when the search for the character string upon registering a new document is executed. Thus, a processing time is reduced.

According to another method for releasing the access control, an "invalid date" field is set to the access control level in advance. When date is set to the "invalid date" field, the record is defined to be invalid after the set date. If a new document is registered after the set date, the character string included in the record is not searched. In this case, the processing time is reduced similarly to the case of deleting the record itself. Further, a history indicating which contents the record has included can be thereafter checked.

As mentioned in the flowchart of FIG. 4, when any desired document is registered in the document management system 10 according to the embodiment, the character string registered in the access control list is searched and it is defined whether or not the document includes the character string registered in the access control list. Then, the ID information of each record is added to each document. The above-mentioned process is based on a basic using method of the document management system of the present invention. On the contrary, there has already been a database in which documents are stored in consideration of only convenience but in no consideration of use limitation. After certain time, it is requested that the document management system according to the embodiment is applied to the database and the access control is set. In this case, the document management system of the embodiment is applied to the existing database in accordance with the following processing routine.

That is, first, the access control list, in which at least one record has been registered, is formed. After forming the access control list, the database is accessed, one of the documents stored in the database is read, and all of the character strings registered in the access control list are sequentially searched. When the character string registered in the access control list is found in the document, the ID information for specifying the record including the found character string is added to the document and the access control is set. Another document is read and the above-described process is performed. Sequentially, all the documents stored in the database are subjected to the similar process and, thus, the document management system according to the embodiment is applied to the existing database and the access to the necessary document can be limited.

The above-mentioned process requires long time if the scale of the database is increased. During the above process, the database is not used for another purpose. However, the above process is executed only once when the document management system is first introduced. Further, the effect to business can be suppressed at the minimum level by executing the above process at time when the database is not frequently used, e.g., at night.

If temporary unavailable time of the database is improved, it may be defined whether or not the character string registered in the access control list is included in a document every requesting the access to the document and, if so, the ID information of the character string may be added at this timing, instead of a process for registering all of the data stored in the database in a lump. In this case, when the access to the document which is not registered in the document management system, is requested, the determination whether or not the access is permitted takes time in some degree. However, it is unnecessary to execute the long time-process for registering all of the documents in a lump when the document management system is first introduced.

If it is possible to use the latter method, when the document is registered in the present document management system which has been already introduced, it can be defined whether or not the character string registered in the access control list is included in the document at time when the access to the document is requested, without determining whether or not the character string registered in the access control list is included in the document at time when the document is registered in the document management system.

However, if the above process is executed, when the number of records registered in the access control list is very large (for example, 1,000 records), the access to one document is requested and then it must be searched whether or not the document to which access is requested includes the character strings in the 1000 records and the search takes long time. Therefore, a method for searching whether or not the document to which access is requested includes the character strings in all records at time when the access to the document is requested is not preferable in view of the efficiency of the business, excluding a case of applying the document management system to a large number of documents which have been already stored, at later time.

As will be obvious from the foregoing, the document management system according to the embodiment is advantageous for managing the documents in a company which handles information which is secret to members in the company or to the outside and for ensuring the security of a large number of documents at various levels in government and other public offices.

Although the embodiment of the present invention is described, the present invention is not limited to the above embodiment. Obviously, the present invention can be modified within the range of the essentials and the modification can be included in the technical range thereof.

As mentioned above, in the present invention, the access controlling information is added to the document before accessing the document and the document with the access controlling information is registered. Therefore, upon access the document, the document management system defines fast how the access to the document is limited and the access is limited based on the defined result. Accordingly, the access can be accurately limited in accordance with various security levels while maintaining an advantage in that a necessary document can be accessed fast if necessary.

What is claimed is:

1. A document management system for limiting user access to a registered document, comprising:
   a first storage means for registering a document to be accessed; and
   a second storage means for registering access controlling information,
   wherein said access controlling information comprises one or a plurality of access controlling information records, and each access controlling information record contains a specific character string and identification data for specifying the access controlling information record; and
   wherein, when registering a certain document in said first storage means or when setting the access control to a document which has already been registered in said first storage means, a search is performed to check whether or not the document includes said each specific character string contained in said access controlling information which has already been registered in said second storage means, and if said specific character string is included in the document, said identification data for specifying said access controlling information record containing the specific character string is added to the document; and
   wherein access to said document registered in said first storage means is limited in accordance with contents of said access controlling information record corresponding to the said identification data, when the access to said document is thereafter requested, if said document contains said added identification data.

2. A document management system according to claim 1, wherein said access controlling information further includes information indicating how the access to said document is limited and, when the access to said document is requested, the access is defined by referring to said information indicating how the access is limited.

3. A document management system according to claim 2, wherein said access controlling information is provided in a single record comprising a plurality of fields, including ID information for identifying said record, and said ID information is added to the document for relating said access controlling information to the document.

4. A document management system according to claim 2, wherein said access controlling information further includes a valid term during which the access is limited.

5. A document management system according to claim 2, wherein said access controlling information further includes information to specify a person to be permitted to access with limitation.

6. A document management system according to claim 2, wherein it is defined whether or not said document includes said specific character string at one of a time when said document is registered, a time when said access controlling information is registered, and a time when the access to said document is requested.

7. A document management system according to claim 1, wherein it is defined whether or not said document includes said specific character string at one of a time when said document is registered, a time when said access controlling information is registered, and a time when the access to said document is requested.

8. A document management system according to claim 7, wherein said access controlling information is provided in a single record comprising a plurality of fields, including ID information for identifying said record, and said ID information is added to the document for relating said access controlling information to the document.

9. A document management system according to claim 7, wherein said access controlling information further includes a valid term during which the access is limited.

10. A document management system according to claim 7, wherein said access controlling information further includes information to specify a person to be permitted to access with limitation.

11. A document management system according to claim 1, wherein said access controlling information further includes information to specify a person to be permitted to access with limitation.

12. A document management system according to claim 11, wherein said access controlling information is provided in a single record comprising a plurality of fields, including ID information for identifying said record, and said ID information is added to the document for relating said access controlling information to the document.

13. A document management system according to claim 11, wherein said access controlling information further includes a valid term during which the access is limited.

14. A document management system according to claim 1, wherein said access controlling information further includes a valid term during which the access is limited.

15. A document management system according to claim 1, wherein said access controlling information is provided in a single record comprising a plurality of fields, including ID information for identifying said record, and said ID information is added to the document for relating said access controlling information to the document.

16. A document management system according to claim 14, wherein said access controlling information is provided in a single record comprising a plurality of fields, including ID information for identifying said record, and said ID information is added to the document for relating said access controlling information to the document.

17. A document management system according to claim 1, wherein said access controlling information consists of the one or a plurality of access controlling information records.

18. A document management system according to claim 1, wherein the user access consists of user viewing, printing, and copying to a medium, of the document stored in the first storage means, and wherein access control includes inhibiting user viewing, printing, copying and/or modification of a part or all of the document.

* * * * *